(12) United States Patent
Van Walraven

(10) Patent No.: US 9,404,264 B2
(45) Date of Patent: Aug. 2, 2016

(54) ROOF SUPPORT SYSTEM

(75) Inventor: Jan Van Walraven, Mijdrecht (NL)

(73) Assignee: J. VAN WALRAVEN HOLDING B.V., Mijdrecht (NL)

( * ) Notice: Subject to any disclaimer, the term of this patent is extended or adjusted under 35 U.S.C. 154(b) by 1032 days.

(21) Appl. No.: 13/202,913

(22) PCT Filed: Mar. 9, 2009

(86) PCT No.: PCT/NL2009/000057
§ 371 (c)(1),
(2), (4) Date: Aug. 23, 2011

(87) PCT Pub. No.: WO2010/104372
PCT Pub. Date: Sep. 16, 2010

(65) Prior Publication Data
US 2011/0303807 A1    Dec. 15, 2011

(51) Int. Cl.
*A47G 29/02*    (2006.01)
*E04D 11/00*    (2006.01)
(Continued)

(52) U.S. Cl.
CPC .............. *E04D 11/005* (2013.01); *E04D 11/00* (2013.01); *E04F 15/024* (2013.01); *F24J 2/523* (2013.01); *F24J 2/525* (2013.01); *F24J 2/5237* (2013.01); *Y02B 10/20* (2013.01); *Y02E 10/47* (2013.01)

(58) Field of Classification Search
CPC ... E04D 11/00; E04D 13/1475; E04D 11/005; E04D 11/007; E04F 15/024; F24J 2/523
USPC ........ 248/420, 429, 68.1, 222.51, 357, 205.1, 248/346.04, 346.06, 133, 371, 398, 131, 248/519, 517, 174, 536, 148, 137, 139, 687, 248/155.3, 511, 512, 414, 520, 514, 910, 248/504, 237; 116/173; 40/218; 52/152, 52/745.18
See application file for complete search history.

(56) References Cited

U.S. PATENT DOCUMENTS 2,667,317 A  *  1/1954  Trebules ........................ 248/514
4,570,397 A     2/1986  Creske
(Continued)

FOREIGN PATENT DOCUMENTS

DE           1 659 314 A      9/1971
DE           1659314 A1  *   9/1971  .............. E04D 11/00
(Continued)

OTHER PUBLICATIONS

International Search Report: mailed Jul. 27, 2009; PCT/NL2009/000057.

*Primary Examiner* — Kimberly Wood
(74) *Attorney, Agent, or Firm* — Flener IP Law, LLC; Zareefa B. Flener

(57) ABSTRACT

A support foot (1) for supporting a free standing structure on a flat roof includes a holding means (34; 62; 63) for holding a profiled section (40) to which other parts of said structure can be mounted. The support foot comprises a base part (2) with a guiding structure (22). The support foot (1) furthermore comprises a skid part (3; 6), which includes the holding means (34; 62; 63) for the profiled section (40) and which is slidably mounted on the guiding structure (22) of the base part (2) so as to position the holding means (34; 62,- 63) for the profiled section (40) in a desired angular position allowing to compensate for a possible slope of the flat roof. The support foot (1) also includes securing means for securing the skid part (3, 6) in said desired angular position on the base part (2).

2 Claims, 6 Drawing Sheets

(51) Int. Cl.
*E04F 15/024* (2006.01)
*F24J 2/52* (2006.01)

(56) References Cited

U.S. PATENT DOCUMENTS

| | | | | |
|---|---|---|---|---|
| 5,165,642 | A | * | 11/1992 | Rihaly .................... E04D 15/02 182/45 |
| 5,377,976 | A | * | 1/1995 | Matherne et al. ............. 473/483 |
| 5,526,010 | A | * | 6/1996 | Plunk .......................... 343/882 |
| 6,106,186 | A | | 8/2000 | Taipale et al. |
| 6,305,659 | B1 | * | 10/2001 | Metelski ................ F16M 11/20 248/519 |
| 6,484,987 | B2 | * | 11/2002 | Weaver ..................... 248/278.1 |
| 6,734,830 | B1 | * | 5/2004 | Bickham ....................... 343/880 |
| 8,136,209 | B1 | * | 3/2012 | Willison ......................... 16/430 |
| 2003/0042374 | A1 | * | 3/2003 | Johnson et al. ................ 248/148 |
| 2004/0035064 | A1 | | 2/2004 | Kugler et al. |
| 2008/0200850 | A1 | * | 8/2008 | Casalino ......................... 601/54 |
| 2014/0033624 | A1 | * | 2/2014 | Blaxland ................... E02B 9/08 52/152 |

FOREIGN PATENT DOCUMENTS

| | | |
|---|---|---|
| DE | 2 139 345 A | 2/1973 |
| WO | 99/23327 A1 | 5/1999 |
| WO | 01/90497 A1 | 11/2001 |
| WO | 2007/048204 A1 | 5/2007 |

* cited by examiner

ROOF SUPPORT SYSTEM

BACKGROUND OF THE INVENTION

The present invention relates to a roof support system. In particular the present invention relates to a roof support foot for a free standing structure on a roof.

It is known to place installations like climate installations, solar panels, walkways, piping etc. on flat roofs. These flat roofs are often provided with an insulation layer with a moisture proof and vaportight sheet, e.g. from bitumen. These insulation layers and sheets are not made to carry high loads. Furthermore, it is desirable to prevent as much as possible piercing the sheets for anchoring a structure to the roof, because the piercings may cause problems with water/moisture resistance of the roof.

To overcome the problem of piercing it is known in the art to place installations free standing on a roof. On the market can be found for example a support system under the name "Big Foot Systems", wherein a support foot is standing free on a roof and the support foot has a socket in which a profiled section, for example a hollow profile with a square cross section, can be inserted. The profiled section extends in a direction perpendicular to the bottom surface of the support foot.

Although the known support system prevents that the insulation layer and moisture proof sheet has to be pierced, it is in practise not fully satisfactory.

In practise most flat roofs have a slope in view of the drainage of water. This slope must be sufficient and will most of the time have an angle of inclination in the range 2°-7° with respect to the horizontal. The known support system placed on a flat roof with a certain slope will result in upright profiles not standing totally vertical. It is obvious that from a practical and constructional point of view, this is disadvantageous.

The present invention has for an object to provide an improved support system for free standing structures on a flat roof.

SUMMARY OF THE INVENTION

This object is achieved by a support foot for supporting a free standing structure on a flat roof, includes a holding means for holding a profiled section to which other parts of said structure can be mounted. The support foot comprises a base part with a guiding structure. The support foot also comprises a skid part, which includes the holding means for the profiled section and which is slidably mounted on the guiding structure of the base part so as to position the profiled section in a desired angular position allowing to compensate for a possible slope of the flat roof. The support foot furthermore includes securing means for securing the skid part in said desired angular position on the base part.

With the support foot according to the invention, which is placed on a flat roof with an inclination, the base part essentially has an inclined position due to the slope of the flat roof. The position of the skid part on the guiding structure of the base part can be adjusted such that the profiled section can be positioned in a vertical or horizontal direction, notwithstanding the fact that the base part is resting on an inclined roof surface. Thus, a support foot is provided which can be used on many different flat roofs and which can be adjusted easily on site to the circumstances.

In a preferred embodiment the guiding structure comprises an arched path such that the profiled section received in the skid part can be positioned in different inclinations, by positioning the skid part on different positions on the arched path.

In a further preferred embodiment the guiding structure has a first arched sliding surface, and the skid part has a second arched sliding surface which is complementary to the first arched sliding surface and engages said first arched sliding surface, wherein preferably the first arched sliding surface is convex and the second arched sliding surface is concave. Alternatively it is also possible to have a concave first arched sliding surface and a convex second arched sliding surface.

In another preferred embodiment the arched path on the base part is flanked by two side walls for preventing movement of the skid part in a direction transverse to the arched path. In this way a simple sideways support for the skid part is provided, which provides additional guiding of the skid part on the arched path.

In one preferred embodiment, the securing means for securing the skid part in said desired angular position on the base part, comprise tensioning means for clamping the skid part to the guiding structure of the base part.

In a further preferred embodiment, the skid part has at least one bore and the guiding structure has a slotted hole, the securing means comprising at least one male tensioning member, preferably a bolt, which extends through said bore and through said slotted hole, the slotted hole allowing the skid part with the male tensioning member to be positioned in the desired position on the guiding structure, the securing means furthermore comprising a female tensioning member, preferably including a nut, for cooperating with the male tensioning member so as to secure the skid part in said desired position on the base part. This provides an easy to use and robust securement of the skid part on the base part.

Preferably the guiding structure, on the side opposite the side where the skid part engages, at least at the location of the slotted hole has a counter surface on which the female tensioning member engages. Preferably the counter surface is provided with ribs, which provides an even better grip of the female tensioning member on the base part. The female tensioning member may comprise a clamping member which engages the counter surface, as well as a nut for tensioning the clamping member against the counter surface, wherein preferably the clamping member has a cavity in which the nut is accommodated. In a further preferred embodiment the clamping member has ribs which engage the ribs on the counter surface whereby a secure connection of the skid part on the base part is ensured.

In one preferred embodiment the holding means for the profiled section comprises at least one socket in which an end of a profiled section is insertable, such that the profiled section is held in an upstanding fashion. Preferably an insert element is provided which is provided in the socket and in which the end portion of the profiled section is inserted, which insert element in a pre-mounting state, in which no profiled section end is inserted, is rotatable around its centre axis to a plurality of orientations within the socket, and which insert element is held in position in a mounted state, in which the end portion of the profiled section is inserted, by clamping.

The insert element may be rotatable to discrete orientations or the insert element may be rotatable in any orientation. In this way an upstanding profiled section may be oriented in any direction such that a structure placed on the roof can extend in any direction on the roof, independently from the direction of the slope.

In another preferred embodiment the holding means comprise at least one receiving means in which a part of the length of the profiled section is supported, such that the profiled section is held in a lying fashion, preferably horizontal.

In a preferred embodiment the base part is provided with male or female positioning means for positioning ballast elements on the base part, which ballast elements are provided with complementary male and/or female positioning means. In this way one or more ballast blocks may be placed in a well defined and solid manner on top of the base part.

The support foot may include an anti-slip and/or anti-vibration mat which is positioned on the underside of the base part. The base part may be provided with male and/or female positioning means and the anti-slip and/or anti-vibration mat may be provided with female and or male positioning means engaging the male and/or female positioning means of the base part.

BRIEF DESCRIPTION OF THE DRAWINGS

The invention will be elucidated in more detail in the following description of preferred embodiments with reference to the drawing.

FIG. 3b shows a perspective view from below the support foot of FIG. 3a;

DETAILED DESCRIPTION

Figure 3A:
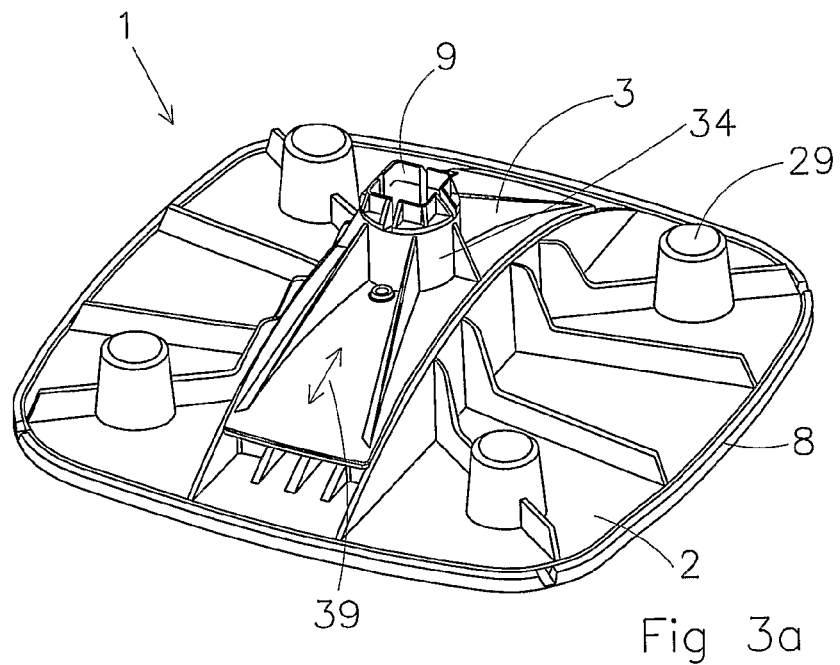
FIG. 3a shows in a perspective view from above a preferred embodiment of the support foot wherein the skid part of FIG. 2 is mounted on the base part of FIG. 1.

In FIG. 3a is shown a support foot 1 comprising a base part 2 and a skid part 3. Both parts 2, 3 are preferably made of plastic by injection moulding, but one or both parts 2, 3 may also be made of another material for example steel or another metal. The base part 2 is shown separately in FIG. 1 and comprises a base plate 21, which in the shown example is substantially square with rounded corners, but which may have any other suitable shape, such as circular, triangular, polygonal, etc. The base plate 21 has a top side, which is visible in FIG. 1, and a bottom side opposite thereof, which is visible in FIG. 3b.

In a middle portion on the top side of the base plate 21 is arranged a guiding structure 22, including longitudinal webs 23 and transversal webs 24. The longitudinal webs 23 have a curved upper edge. The web arrangement is flanked by two side walls 26. The side walls 26 extend in an upward direction beyond the upper edges of the webs 23, 24. The side walls 26 have in the specific embodiment shown a curved upper edge, but this is not necessary. In the middle region of the guiding structure 22 an arched surface portion 25 is provided. The upper edges of the webs 23, 24 and the arched surface portion 25 constitute an arched sliding surface. In the arched surface portion 25 is provided a longitudinal slot 27. On the bottom side of the arched surface portion 25 is provided a cavity 210 which is open on the bottom side and which is visible in FIG. 3b.

From the side walls 26 are extending stiffening ribs 28 on the upper side of the base plate 21 towards the edge of the base plate 21. Instead of the stiffening ribs 28, also other means for stiffening the structure my be provided.

Figure 3B:
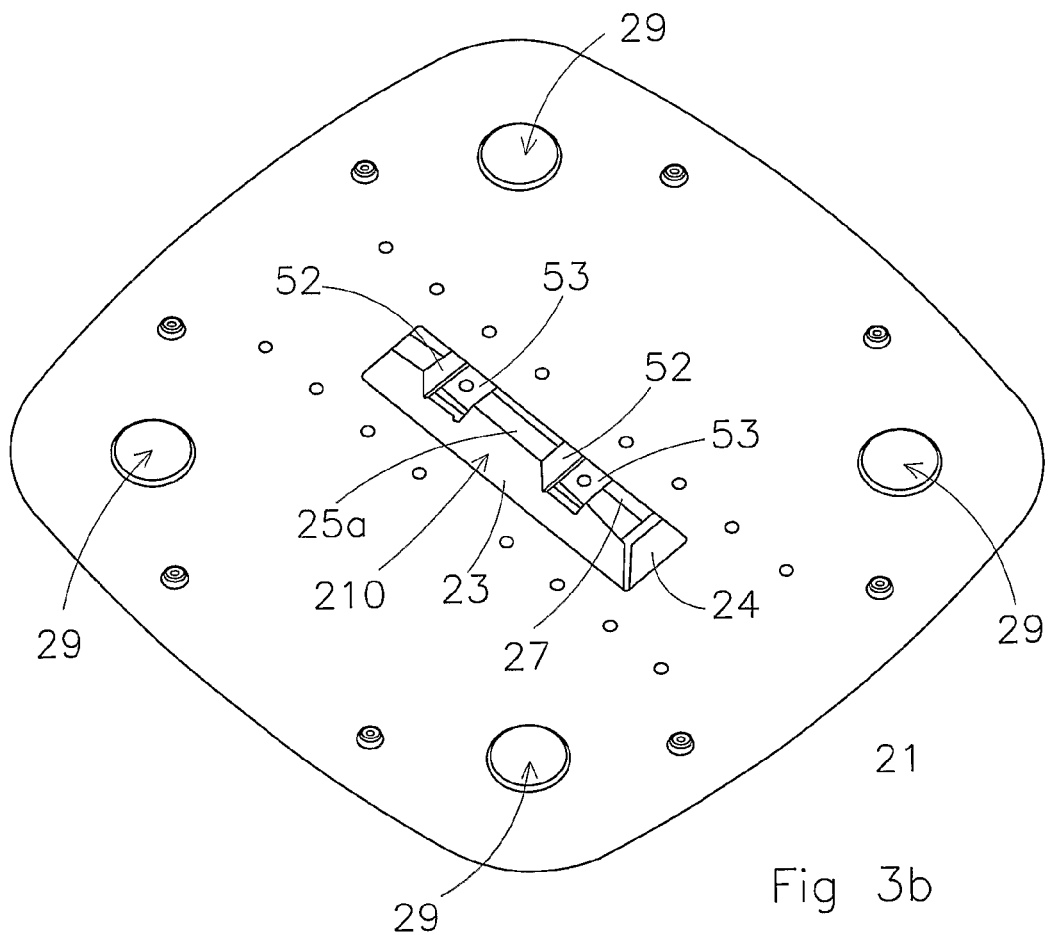

Near the four corners of the base plate 21 an upwardly extending positioning means 29 is arranged on the base plate 21. The positioning means 29 are hollow and open on the bottom side of the base plate 21 as can be seen in FIG. 3b.

Figure 2:
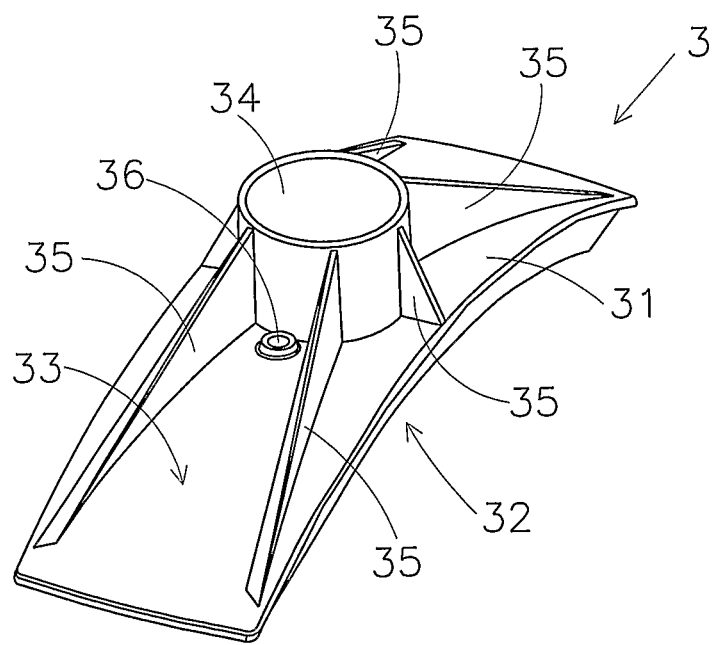
FIG. 2 shows in a perspective view a skid part of a preferred embodiment of a support foot according to the invention.

In FIG. 2 is shown a skid part 3. The skid part 3 essentially comprises an arched body 31 with a concave bottom surface 32 and a convex upper surface 33. The concave bottom surface 32 constitutes a sliding surface which engages the arched sliding surface of the base part 2 as can be seen in FIG. 3a.

On the upper surface 33 in the middle is provided a cylindrical socket 34 which in the shown embodiment is integral with the arched body 31. From the outside of the socket 34 on the upper surface 31 are extending stiffening ribs 35 towards the edge of the arched body 31. It is also conceivable to have no stiffening means or other stiffening means than the ribs 35 shown in the figure.

The socket is cylindrical with a circular cross-section, but may also have another shape. For example a socket with a square cross-section is conceivable. Also a polygonal shape is conceivable.

In front of the cylindrical socket 34 on the longitudinal axis is provided a bore 36. A same bore 36 is provided on the diametrical opposite side of the socket 34.

In FIG. 3a is shown that the skid part 3 is mounted on the guiding structure 22 of the base part 2.

Figure 8:
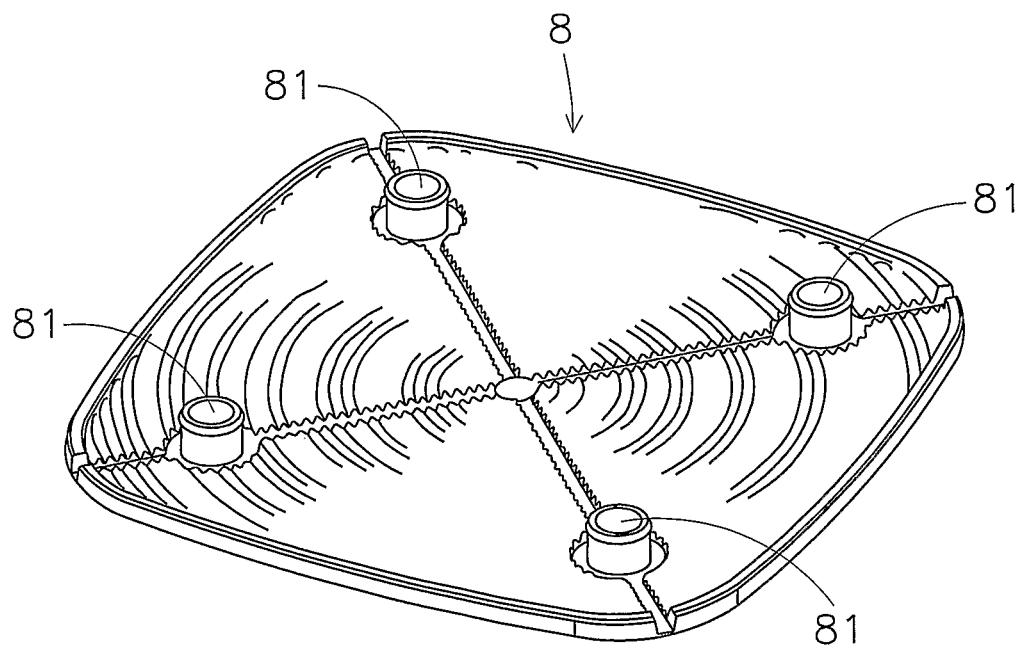
FIG. 8 shows an anti-vibration mat for the support foot of the present invention.

On the underside of the base part 2 may be provided a vibration isolating anti-slip mat 8, which is shown separately in FIG. 8. The anti-slip mat 8 is made of a suitable isolating material, for example rubber. In the shown embodiment the mat 8 has substantially the same contour as the base plate 21 of the base part 2 and may be ribbed on the upper side as is shown in FIG. 8. However the mat may also have another shape as is shown here. In the corner regions are provided upwardly extending male positioning means 81, which mate with the female positioning means 29 on the bottom side of the base plate 21 of the base part 2.

In FIG. 3a the skid part 3 is mounted in a middle position on the guiding structure 22. Thus the centre axis of the socket 34 of the skid part 3 extends perpendicular with respect to the base plate 21 of the base part 2. The skid part 3 can slide on the guiding structure 22 in the direction illustrated by the double arrow indicated with reference numeral 39.

Figure 4:
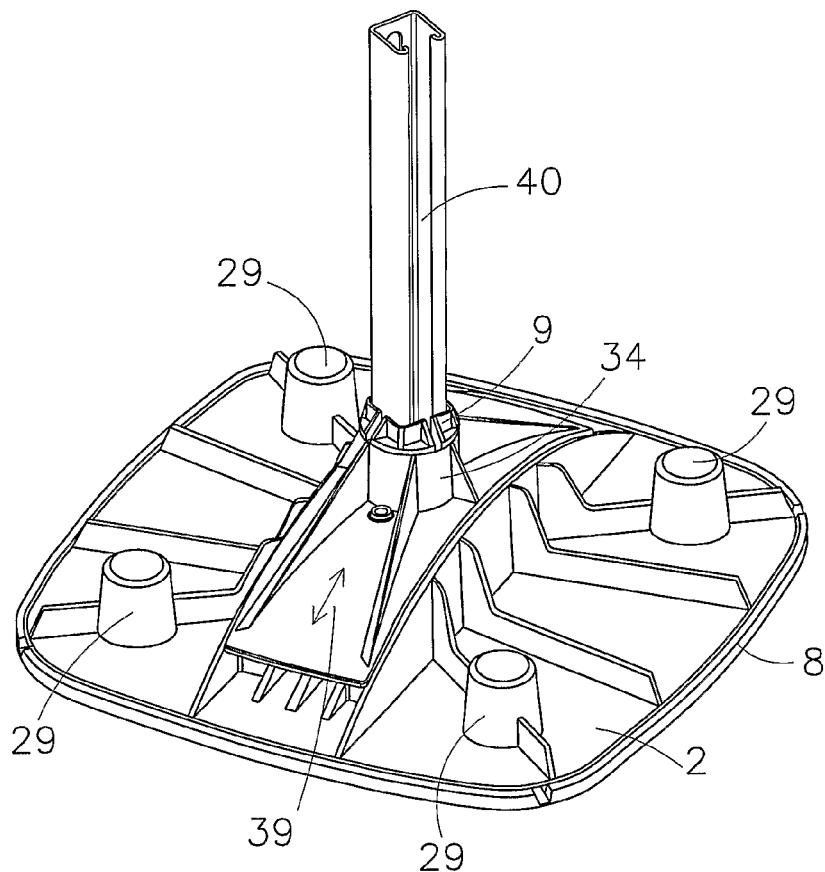
FIG. 4 shows the support foot of FIG. 3 in which a profiled section is held in an upstanding manner.
Figure 5:
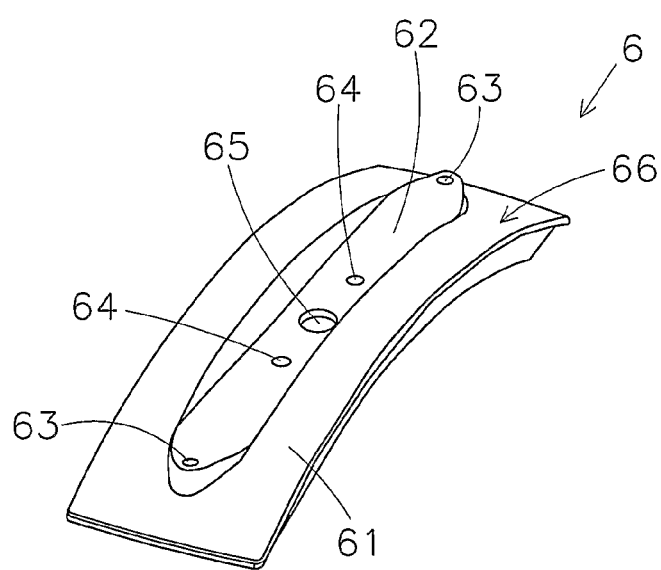
FIG. 5 shows in perspective view another skid part of a preferred embodiment of the support foot according to the invention.
Figure 9:
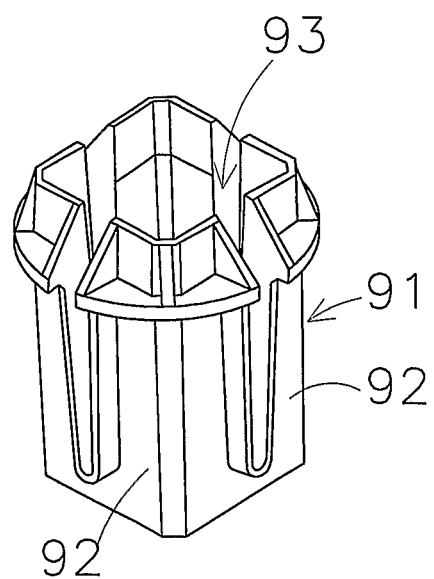
FIG. 9 shows an insert element for use with the skid part of FIG. 2 or the socket in FIG. 7.

In the socket 34 is inserted an insert element 9, which is separately shown in FIG. 9. The insert element 9 in the shown embodiment has a body 91 with a substantially square cross section, wherein the body 91 has four slotted side walls 92. The outer dimensions of the body 91 are such that the body 91 can be positioned in any orientation within the cylindrical socket 34. The insert element 9 has an open upper end 93 through which a profiled section, for example a C-profile or strut profile 40 can be inserted as is shown in FIG. 4. Through the insertion of the end portion of the profiled section 40 in the insert element, the insert element 9 is clamped against the inner side of the socket 34 and thereby secured in position.

In FIG. 3a is shown how the insert element 9 is oriented such that the side walls 92 extend substantially parallel to the sliding direction 39 (see FIG. 3a) of the skid part 3 on the guiding structure 22. However, as mentioned before, insert element 9 can be rotated through 360° in a pre-mounting state when no profiled section is inserted. An arbitrary orientation of the insert element 9, different from the one in FIG. 3A is shown in FIG. 4.

If the socket has for example a square cross-section, the profiled section with the insert element can be positioned in four different angular positions.

By sliding the skid part 3 on the guiding structure 22 a certain inclination of the socket 34 with respect to the base plate 21 can be selected. This is done to compensate for the slope of the flat roof on which the support foot is placed, such that the profiled section 40 extends in the vertical direction. When a suitable position of the skid part 3 on the guiding structure 22 is selected, the skid part 3 can be secured to the guide structure 22 of the base part 2 as is illustrated in FIG. 10.

Figure 10:
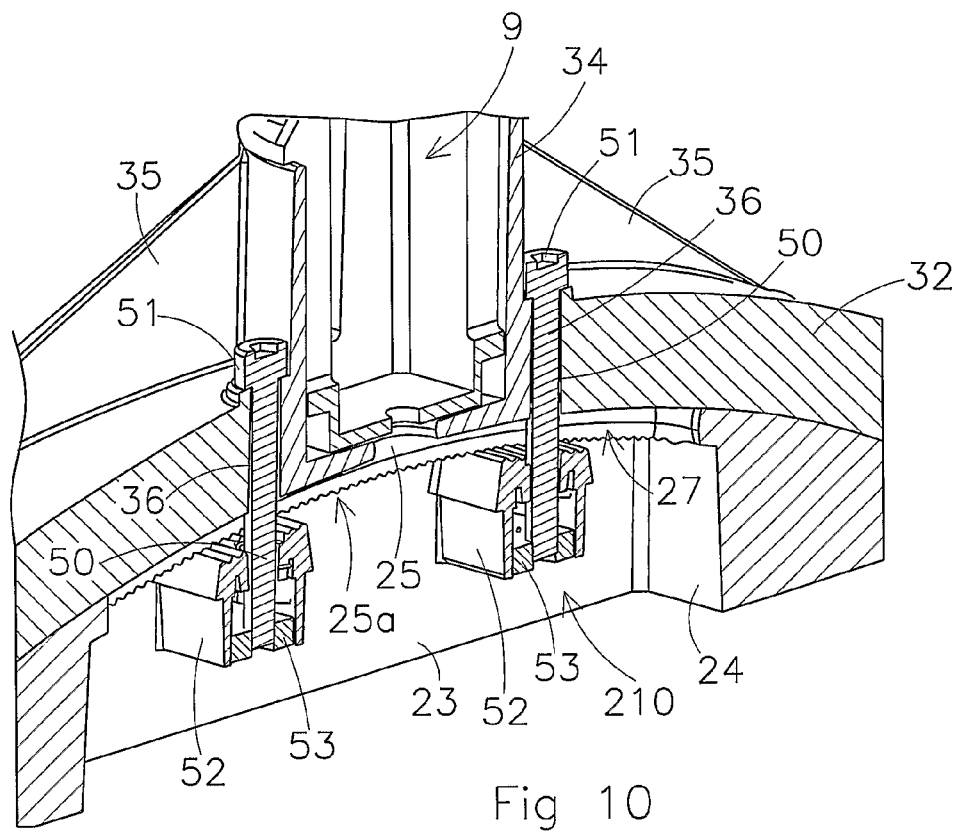
FIG. 10 shows in a sectional view securing means securing the skid part of FIG. 2 to the base part of FIG. 1.

In FIG. 10 is shown how a bolt 50 extends through each of the bores 36 in the skid part 3. Each bolt 50 has a bolt head 51 which rests on the upper surface of the skid part 3. The bolts 50 extend through the slot 27. At the opposite end of the bolt 50 a clamping element 52 is provided with a nut 53 incorporated in it. The upper side of the clamping element 52 engages the bottom side of the arched surface portion 25, which bottom side constitutes a counter surface for the clamping action securing the skid part 3 to the base part 2. The counter surface is indicated by reference numeral 25a and is in the shown embodiment provided with ribs. The upper side of the clamping element 52 is also provided with ribs, such that upon tightening the nut 53 on the bolt 50, the clamping element 52 firmly engages the counter surface 25a and a good securement is assured.

Furthermore, the clamping element 52 has a width that corresponds essentially to the width of the cavity 210. Hereby the clamping element 52 with the nut 53 in it can not rotate with respect to the base part 2. Thus the clamping element 52 can be tensioned against the counter surface 25a by simply rotating the bolt 50 at the bolt head 51. Thus the skid part can be secured on the guiding structure 22 of the base part 2 between the extreme positions on the arched surface, which might be a 7° angle with respect to the middle position. The maximum angle might however also be smaller or greater.

Figure 1:
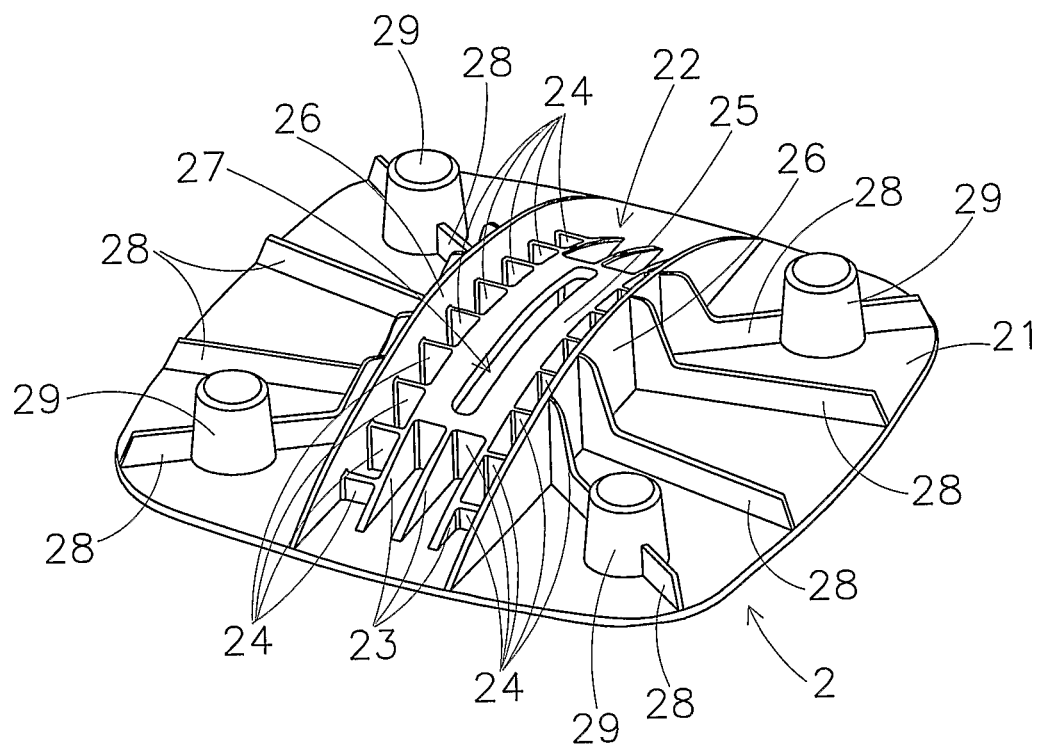
FIG. 1 shows in a perspective view a base part of a preferred embodiment of a support foot according to the invention.
Figure 6:
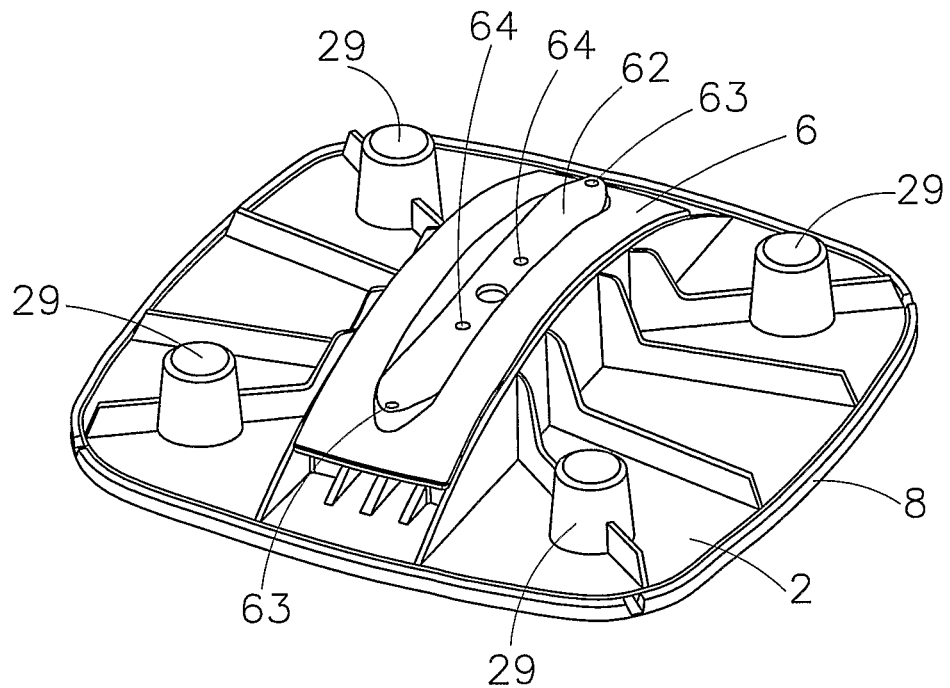
FIG. 6 shows a preferred embodiment of the support foot wherein the skid part of FIG. 5 is mounted on the base part of FIG. 1.

In FIG. 6 is shown a different embodiment of a support foot according to the invention. In this embodiment the same base part 2 is used as is used in the previously described embodiment, thus the base part that is shown in FIG. 1.

Figure 7:
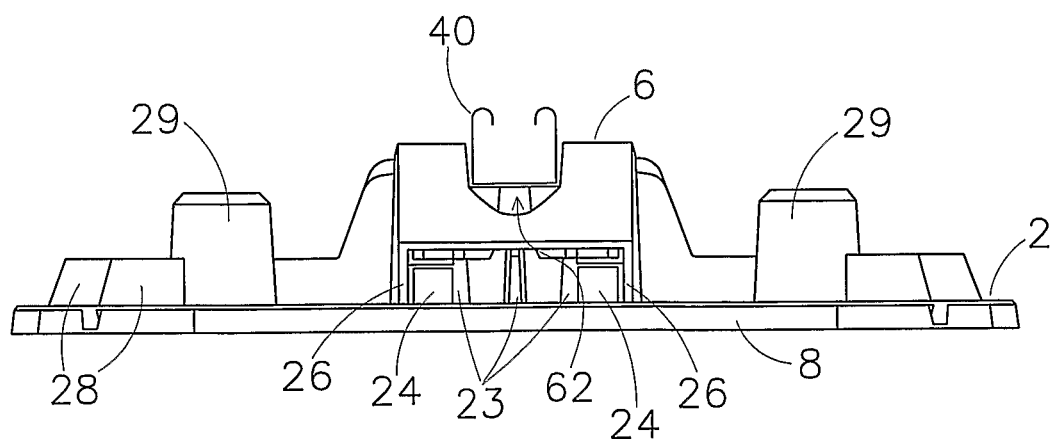
FIG. 7 shows a front view of a support foot of FIG. 6 with a profile rail placed in it.

The support foot of FIG. 6 has a skid part 6 which is shown separately in FIG. 6. This skid part 6 is adapted to receive a profiled section 40, in this case a strut rail which extends horizontally (see FIG. 7) rather than in an upstanding (vertical) fashion which was described in the previously described embodiment. The functionality of the skid part 6 is the same as the skid part 3, but the difference is that it has no socket but a flat support surface 62 for supporting one side of a profiled section, for example a C-profile. The support surface 62 is somewhat countersunk in the body 61 of the skid part 6. In the support surface 62 are provided one or more bores 63 through which a bolt can be run to fix the C-rail to the skid part 6. Also bores 64 are provided through which bolts can be which extend through the slot 27 in the guiding structure 22 of the base part, to secure the skid part 6 in a certain position similar to the previously described embodiment.

Figure 11:
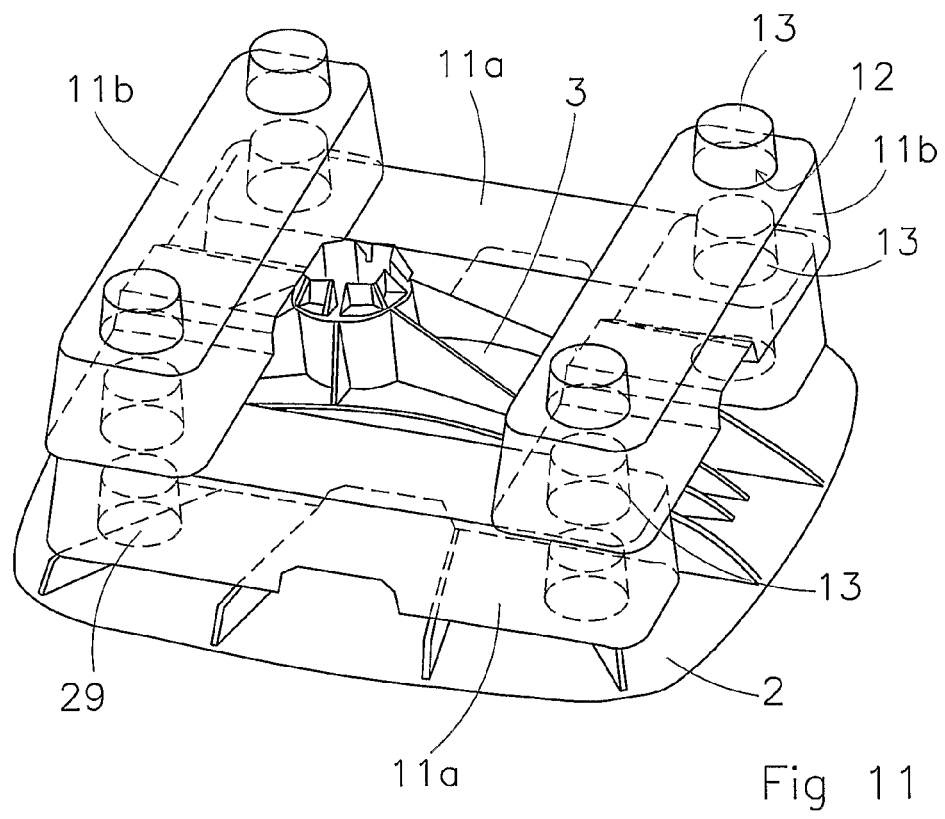
FIG. 11 shows a support foot with ballast blocks stacked on it.

In FIG. 11 is shown a support foot as is shown in FIG. 4. As can be seen the skid part 3 has been fixed under a certain angle with respect to the middle position of the skid part 3. In this way the slope of a flat roof can be compensated such that the upstanding profiled section 40 (not shown in this figure) extends in a vertical direction. On the base plate 21 of the base part 2 are arranged two parallel ballast blocks 11a which near the respective ends are provided with holes 12. The holes 12 are positioned over the male positioning means 29 on the base plate 21, such that the ballast blocks 11a are well held in position on the base plate.

On the upper side of the ballast blocks 11a are provided upwardly extending protrusions 13. In a transverse direction are placed two parallel ballast blocks 11b. These ballast blocks are the same as the ballast blocks 11a and the protrusions 13 of the lower ballast blocks 11a are inserted in the holes 12 of the upper ballast blocks 11b. Thus four ballast blocks can be positioned in a well defined and solid manner on a support foot in order to keep it standing firmly on a roof surface, even if the roof is inclined and the structure that is supported by the support foot applies some kind of tilting moment on the foot. Of course also more ballast blocks 11a, 11b can be stacked.

What is claimed is:

1. A support foot for supporting a free standing structure on a flat roof, said support foot comprising:
   a base part formed in one piece of a plastic material, said base part including a base plate and a guiding structure, the base plate having a top side and a bottom side opposite the top side, and said base plate having cup shaped positioning members,
      wherein each positioning member has a first end configured to receive a ballast block female positioning hole and a second end configured to receive a rubber anti-slip or anti-vibration mat, and are hollow,
      wherein the positioning members extend upwardly from the top side of the base plate to the first end, extend through and are contiguous with the base plate, and terminate at an open second end on the bottom side of the base plate;
   a skid part, said skid part including a profiled section holder to hold a profiled section of said free standing structure in an upstanding fashion, said profiled section holder comprising a socket, and said skid part being slidably mounted on the guiding structure of the base part so as to position the profiled section holder in a desired angular position allowing to compensate for a possible slope of the flat roof;
   a securing element for securing the skid part in said desired angular position on the base part;
   one or more ballast blocks arranged on the top side of the base plate, said ballast blocks having female positioning holes mating with said cup shaped positioning members extending upwardly from the top side of the base plate; and
   a rubber anti-slip and/or anti-vibration mat which is positioned on an underside of said base part, wherein said anti-slip and/or anti-vibration mat is provided with upwardly extending male positioning members mated with the open second end of the cup shaped positioning members at the bottom side of the base part.

2. A support foot for supporting a free standing structure on a flat roof, said support foot comprising:
   a base part formed in one piece of a plastic material, said base part including a base plate and a guiding structure, the base plate having a top side and a bottom side opposite the top side, and said base plate having cup shaped hollow positioning members,
      wherein each positioning member has a first end configured to receive a ballast block female positioning hole and a second end configured to received a rubber anti-slip or anti-vibration mat, wherein said cup shaped positioning members extend upwardly from the top side of the base plate terminating at the first end, are contiguous with and extend through the base plate, and are open at the opposite second end at the bottom side of the base plate;

a skid part, including a profiled section holder to hold a profiled section of said free standing structure in an upstanding fashion, said skid part being slidably mounted on the guiding structure of the base part so as to position the profiled section holder in a desired angular position allowing to compensate for a possible slope of the flat roof;

a securing element for securing the skid part in said desired angular position on the base part; and a rubber anti-slip and/or anti-vibration mat which is positioned on an underside of said base part, wherein said anti-slip and/or anti-vibration mat is provided with upwardly extending male positioning members which are mated to the cup shaped positioning members through the hollow portion at the open second end at the bottom side of the base plate.

* * * * *